E. A. ANGUS.
SHUTTLE REPLENISHING MECHANISM.
APPLICATION FILED DEC. 1, 1904.

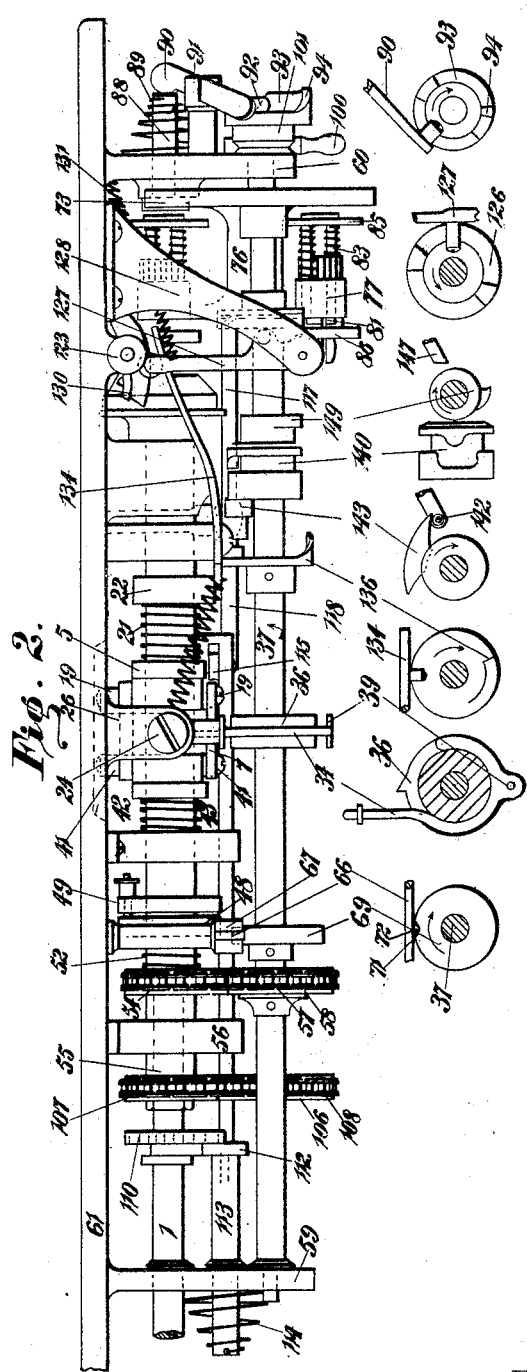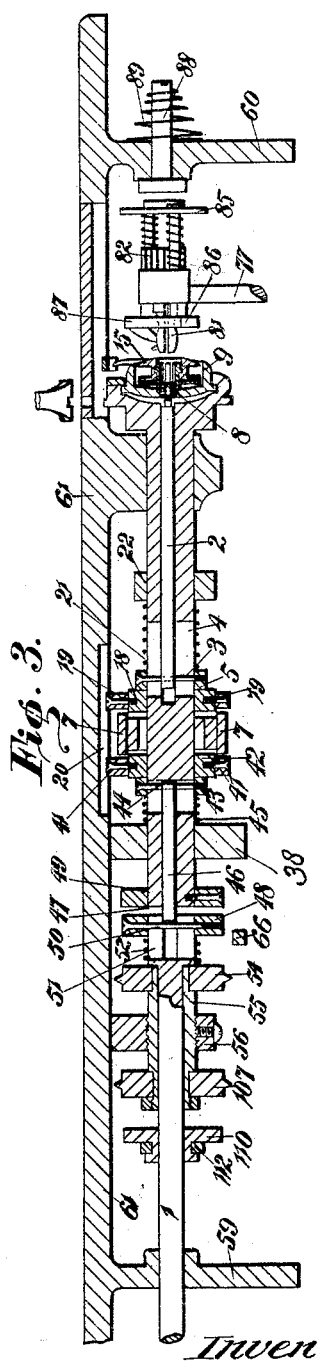

906,987.

Patented Dec. 15, 1908
5 SHEETS—SHEET 3.

Witnesses:

Inventor
Edmund A. Angus
James L. Norris
Atty.

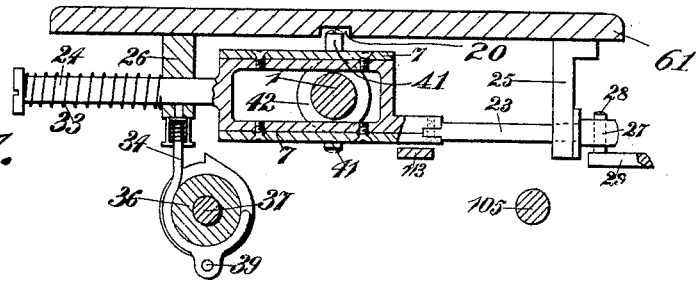
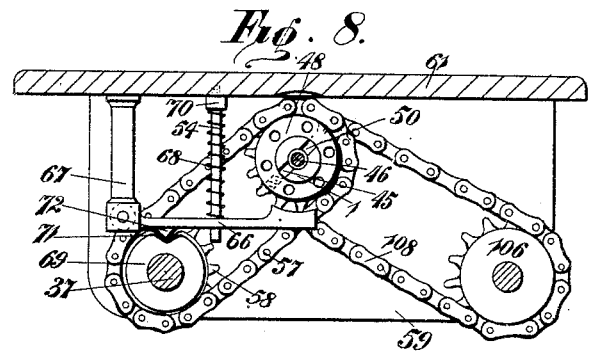
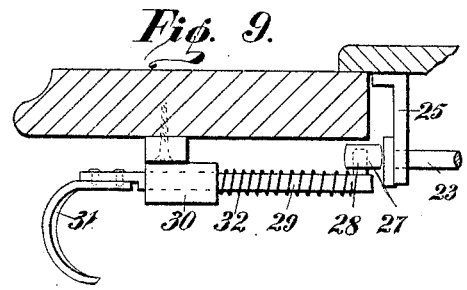
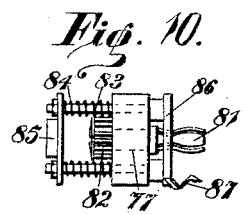 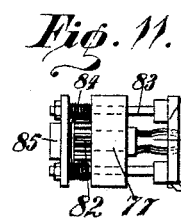 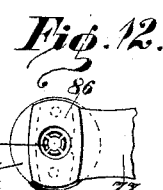

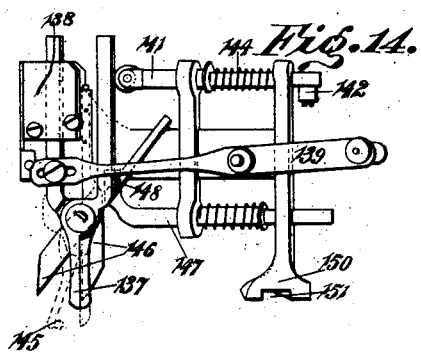
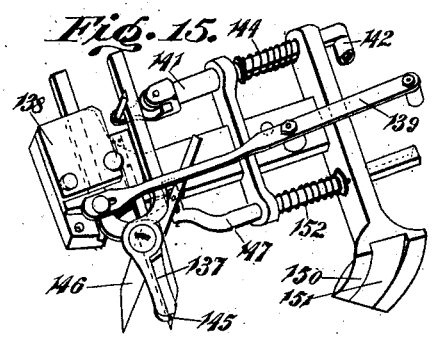
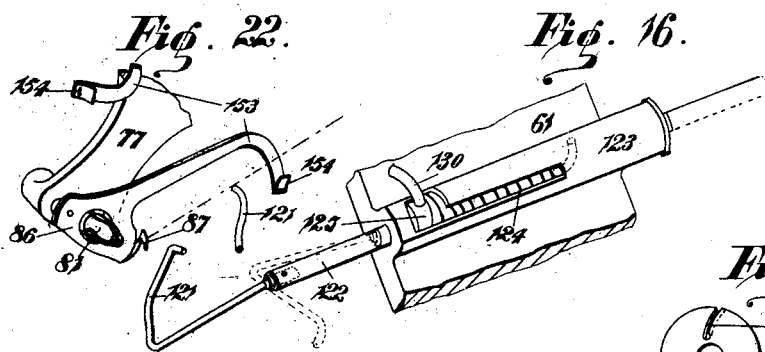
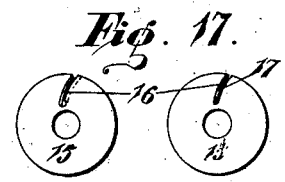
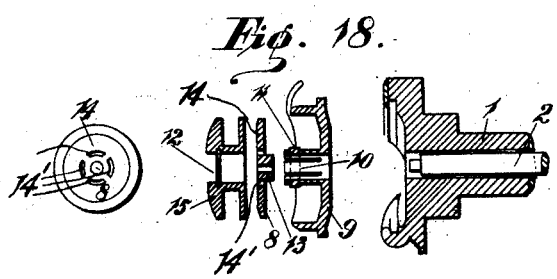
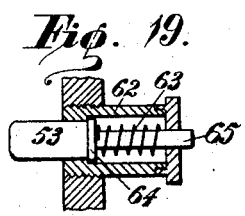
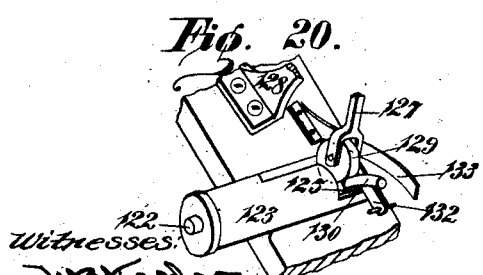
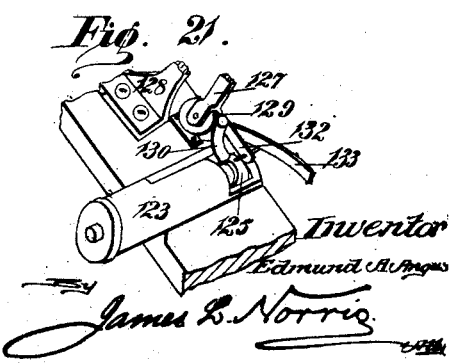

UNITED STATES PATENT OFFICE.

EDMUND ALBERT ANGUS, OF MOONEE PONDS, NEAR MELBOURNE, VICTORIA, AUSTRALIA.

SHUTTLE-REPLENISHING MECHANISM.

No. 906,987.      Specification of Letters Patent.      Patented Dec. 15, 1908.

Application filed December 1, 1904. Serial No. 235,108.

*To all whom it may concern:*

Be it known that I, EDMUND ALBERT ANGUS, a citizen of the Commonwealth of Australia, residing at Moonee Ponds, near Melbourne, in the State of Victoria, Australia, have invented new and useful Improvements in or Relating to Shuttle-Replenishing Mechanisms, of which the following is a specification.

This invention has been devised for the purpose of enabling the metal spools or other bobbins of all descriptions of sewing machines to be automatically wound or filled and inserted into the shuttle or bobbin case of the machine by mechanical means and, when empty, removed therefrom, the threading of the tension device or devices being effected when the bobbin is inserted into the shuttle or bobbin case.

In order that my invention may be clearly understood I will describe it by reference to the accompanying drawings, in which;—

Figure 1:
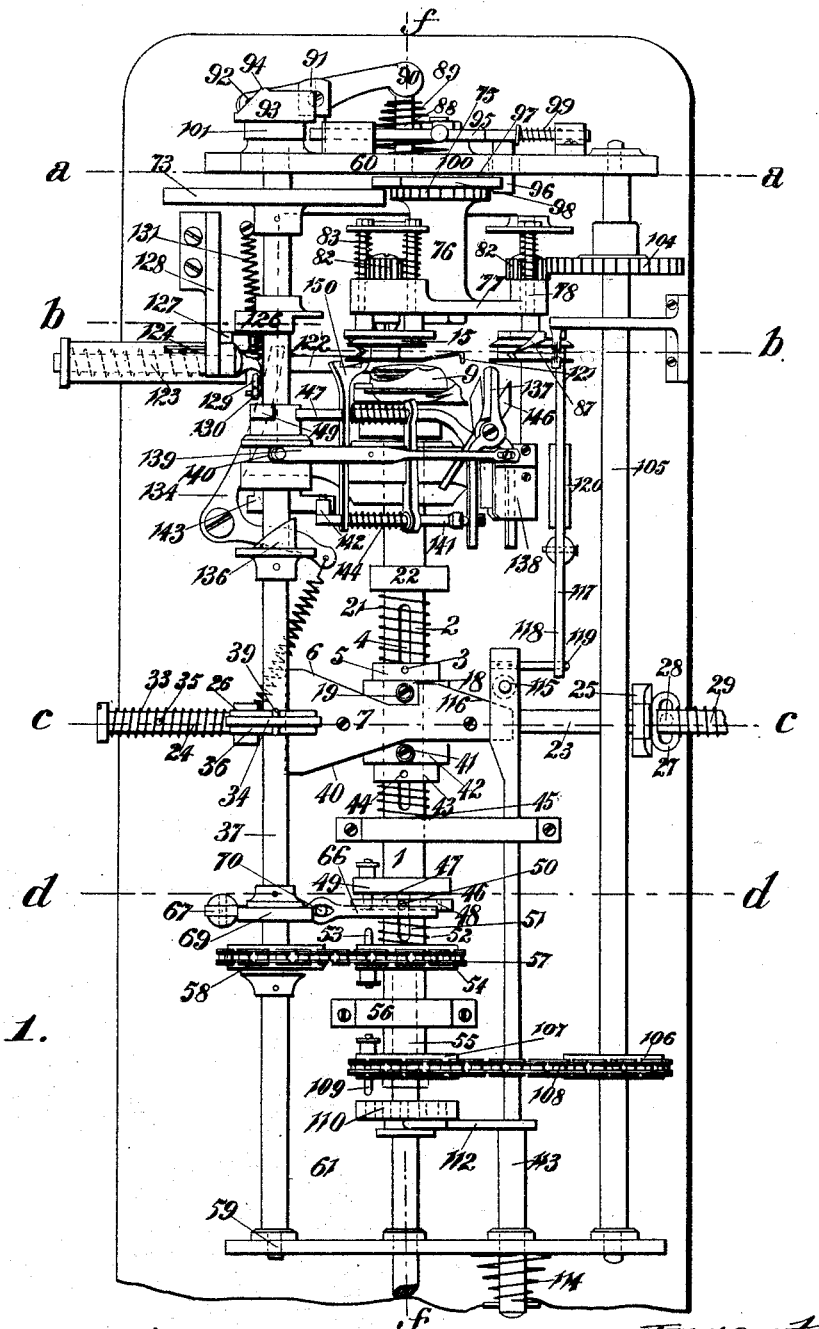
Figure 4:
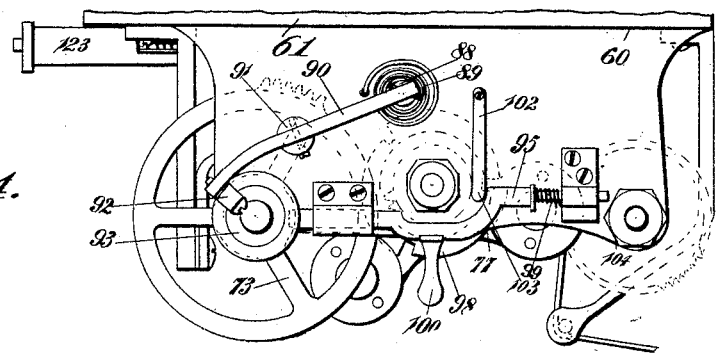

Figure 1 is an underside plan or portion of a rotary shuttle sewing machine constructed according to my invention, the part not shown, including the webbing of the bed plate and feed mechanism, being of the ordinary pattern. Fig. 2 is a rear elevation of the same parts shown in Fig. 1 with certain operative parts projected and shown in separate figures below. Fig. 3 is a vertical central section on line *f—f*, Fig. 1. Fig. 4 is an end elevation of the machine, while Figs. 5, 6, 7 and 8 are vertical transverse sections on lines *a—a*, *b—b*, *c—c* and *d—d* respectively on Fig. 1. Fig. 9 is a fragmentary view disclosing in detail the spring controlled sliding rod 29 and handle; Fig. 10 is a detail view in side elevation of the pusher plate, cotton guiding hook and spring controlled pusher spindles for the said plate; Fig. 11 is a further detail view thereof disclosing the pusher plate in a different position; Fig. 12 is a fragmentary view of one of the arms of the bobbin conveyer having the pusher plate and operative parts connected thereto; Fig. 13 are views in detail of the main shaft pushing off spindle and sliding sleeve; Fig. 14 is a detail plan view of the cutting mechanism; Fig. 15 is a perspective elevation thereof; Fig. 16 is a view in perspective elevation of the spring controlled hook shaped arm and its support; Fig. 17 shows face views of the bobbins; Fig. 18 are detached views of the bobbin case and bobbin with its operative parts in detail; Fig. 19 is a sectional view in detail of the spring controlled pin 53 in the capped tube 62; Fig. 20 is a fragmentary view showing in detail the sliding spindle and casing for supporting the same; Fig. 21 is a fragmentary view in perspective elevation of the sliding spindle 122, casing therefor, and a lever 127 for acting on the sliding spindle; Fig. 22 is a fragmentary view in perspective elevation of the arm 77 and one of the arms 153 fixed to the pushing off plate 86.

The same reference numerals indicate the same or corresponding parts in all the figures.

Shafts are mounted in suitable bearings projecting downwardly from the bedplate of the machine. To facilitate the description of the invention I will term one of these the "main shaft", another the "cam shaft" and the third the "winder shaft".

The mechanism described in detail in the following specification accomplishes the following functions;—It pushes the emptied bobbin out of the bobbin case and removes it, at the same time it brings a freshly wound bobbin into position to be pushed into the bobbin case, pushes this in, threads the under tension (*i. e.* that upon the bobbin case) cuts the cotton between the freshly wound bobbin and the supply reel, winds another bobbin and automatically throws the winding and charging mechanism out of gear when the bobbin case has been recharged and the empty bobbin has been rewound so that there will be no unnecessary friction.

The main or shuttle shaft 1 is preferably made hollow and is fitted with a bobbin pushing off shaft or spindle 2 (see Fig. 3) sliding longitudinally within said main shaft and connected by a pin 3 passing through a slot or slots 4 in said hollow main shaft 1 with a sliding sleeve or collar 5 operated by the inclined edge 6 of a pair of sliding plates or cams 7 which are adapted to be withdrawn or moved laterally (of the machine) by the operator when a fresh bobbin is required to be transferred to the bobbin case.

The shuttle end of the pusher off shaft 2 is reduced as illustrated in Fig. 18 so that portion of the same can fit into a central hole in a pushing out washer 8 which fits loosely inside the bobbin case 9 and communicates the motion of said pusher off shaft 2 to the bobbin 15 to be pushed off. The said bobbin 15 is normally held on a split sleeve 10 of the bobbin case by an annular ridge 11 projecting from said split sleeve 10 which engages with a groove 12 in the bobbin 15. This pusher out washer 8 has circumferentially arranged openings 14' formed by webs 14 through which the split sleeve 10 passes and the said webs 14 extending through the slots in the said sleeve. Also said pusher out washer 8 has a boss 13 which fits inside the split sleeve 10. Each of the bobbins 15 has an inclined slot 16, Fig. 17, which engages the cotton upon the commencement of the winding operations. This slot may if preferred have a spring 17 fixed near the outer rim in order to grip the cotton.

A loose collar or sleeve 18 is mounted upon the main shaft 1 between the sliding sleeve 5 and the sliding plates 7 and is fitted with antifriction rollers 19 19 against which the inclined surfaces 6 6 of said sliding plates 7 bear when said plates are withdrawn by the operator.

The upper of the two rollers 19 19 projects into a slot or recess 20 (see Fig. 7) in the underside of the bedplate of the machine and is thereby stopped from rotating with the main shaft 1 so that said rollers 19 19 will always be in position opposite the inclined surfaces 6 6 ready to be acted upon by said surfaces.

A spiral spring 21 is arranged around the main shaft 1 and bears against the sleeve 5 and the collar 22 of the feed cam so that it always tends to return the pushing off spindle 2 to its normal or withdrawn position.

The laterally sliding plates 7 are supported by two rods 23 and 24 mounted in bearings 25 and 26. One of said rods 23 is fitted with a ring 27 which engages with a pin 28 when the machine is in operative position. This pin projects up from a sliding rod 29 (see Fig. 9) mounted in a bearing 30 which is fixed to the stand, said rod having a handle 31 to facilitate its withdrawal and a spiral spring 32 to keep it in its normal position so that the pin 28 will engage with the ring 27 when the machine is closed down upon its stand.

The rearwardly projecting rod 24 is fitted with a spiral spring 33 whose tendency is to always return the laterally sliding plates 7 to their rearward or normal positions.

The laterally sliding plates 7 are in duplicate, one part being above the main shaft 1 and the other below in order to equalize the strain upon the mechanism operated by said plates.

A vertical sliding spring locking pin or bolt 34 (see Figs. 2 and 7) is arranged under the bearing 26 and normally bears against the surface of the rearwardly projecting rod 24 so that when the laterally sliding plates 7 are withdrawn, as hereinafter described, it will project into engagement with a small hole or recess 35 (see Fig. 1) in said rod and will hold it in its forward position until withdrawn by a grooved cam 36 upon the cam shaft 37 contacting with a pin 39 fixed in the semi-circular downwardly projecting part of the locking pin 34.

On the opposite sides of the laterally sliding plates 7 two other inclined surfaces 40—40 are arranged to bear against anti-friction rollers 41 41 upon a sleeve or collar 42 which, while being free to move laterally, is prevented from rotating in a similar manner to the sleeve 18 above described. This sleeve 42 bears against another sleeve 43 which is free to slide longitudinally upon the main shaft 1. A pin 44 passes through a slot in the main shaft and connects the sleeve 43 with a shaft or spindle 46 (see Fig. 3) of similar construction to the pusher shaft 2. A spiral spring 45 is wound upon the main shaft and bears against the sleeve 43 and a bearing bracket 38. This spring tends to keep the spindle 46 in its normal position. The main shaft 1 is divided as illustrated at 47 and is supported in bearings in two brackets 38 and 56. The forward or shuttle half is normally connected to the rear half by a clutch 48 gearing with a clutch 49 which is mounted upon the main shaft on the shuttle side of the division. The main shaft is divided in this way so that the forward or shuttle end may be disconnected and will remain stationary during the operation of inserting a freshly wound bobbin into the bobbin case. By this means no loop of cotton will be formed over the face of the bobbin case which would be likely to get tangled with the bobbin as it was being inserted.

The end of the shaft or spindle 46 bears against a pin 50 fixed in the clutch 48 which passes through a slot 51 in the main shaft 1. Said clutch 48 is mounted loosely on the main shaft so that it can slide longitudinally thereon but is caused to rotate with the shaft by the pin 50. A spring 52 normally holds this sliding clutch 48 in gear with the clutch 49 but when a fresh bobbin is required the said sliding clutch 48 is caused to disengage the clutch 49 and to engage with a disappearing clutch pin 53 projecting from a sprocket wheel 54 which is mounted upon a tubular bearing 55 projecting from the bracket 56 through which the main shaft passes.

A chain 57 connects this sprocket wheel 54 with another sprocket wheel 58 mounted upon the cam shaft 37. This latter is mounted in suitable bearings in brackets 59 and 60 carried by the bedplate 61 of the machine.

The pin 53 is constructed (as shown in Fig. 19) so that it can slide longitudinally in a capped tube 62. A spiral spring 63 normally keeps this pin 53 in its forward position and a shoulder 64 keeps the said pin from falling out, a tail rod 65 keeping it from oscillating. A small spring clutch locking or trip lever 66 (see Figs. 1 and 8) is fulcrumed at its rear end upon a suitable support 67 and its front end is arranged to engage behind the clutch 48. A spiral spring 68 coiled around a vertical stud 70 which passes through a slot in said lever 66 tends to hold it out of engagements with the clutch 48. A cam 69 is mounted upon the cam shaft 37 and consists of a circular disk 69 with a notch or recess 71 (see 2 and 8) into which a projection 72 upon the lever 66 normally projects so that said lever 66 can be held out of engagement with the clutch 48 by the spring 68.

Figure 5:
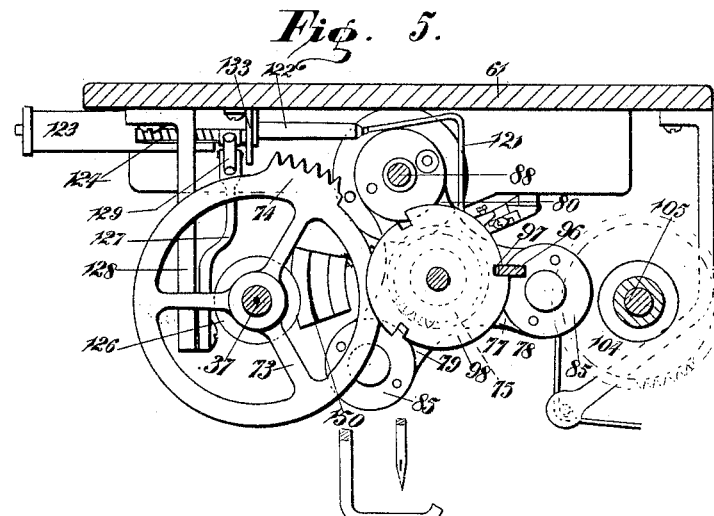
Figure 6:
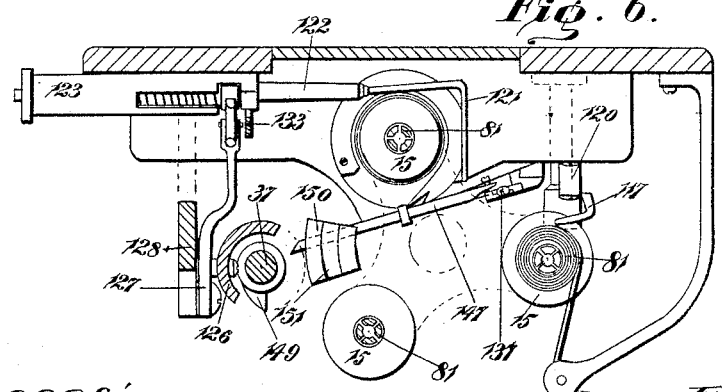

Near the forward end of the cam shaft 37 is a wheel 73 having only a few teeth 74 upon its circumference as shown in Fig. 5 said teeth being arranged to engage with a toothed wheel 75 (see Fig. 1) rotating upon a fixed shaft. The wheel 75 is fixed to the sleeve 76 of a rotating metal spool or bobbin carrying disk or conveyer 77. If preferred instead of using the wheel 73 with a few teeth only upon its circumference a toothed segment or a toothed quadrant rack may be used. The teeth 74 and the teeth on the wheel 75 are so proportioned as to turn this latter and therefore the bobbin conveyer 77 through one third of a revolution for each complete revolution of the cam shaft 37.

The bobbin conveyer 77 (see Figs. 1, 5 and 6) is constructed with three radial arms 78, 79 and 80 cast with or otherwise attached to the sleeve 76. Instead of these arms a circular or other conveniently shaped disk of metal might be employed. Projecting from the ends of each of these arms of the conveyer is a small split spring gripping spindle 81 (Figs. 10, 11 and 12) which is mounted in bearings in its arms so that it may rotate freely. The rear ends of these gripping spindles 81 are fitted with small toothed pinions so that they can be rotated as hereafter described. The forward ends of each gripping spindle 81 is split so that it can expand slightly and thereby grip a bobbin when it is pushed on to said gripping spindle.

Three metal, or other bobbins 15 are carried by the bobbin conveyer, one on each gripping spindle 81, all of which are upon and carried by the bobbin conveyer 77 when said bobbin conveyer is revolved but normally one of the bobbins is within the bobbin case, its particular gripping spindle being kept opposite to said bobbin case until the said bobbin is emptied and pushed out. Parallel with these expanding gripping spindles 81 is or are one or more sliding pusher spindles 83. Around the rear end of each pusher spindle 83 is coiled a spiral spring 84 whose tendency is to withdraw said spindle together with the pusher plate 85 at its rear end and a pushing off plate 86 at its forward end. Each of the plates 86 is fitted with a curved projecting cotton guiding hook 87 for a purpose hereinafter described.

A longitudinally sliding spindle 88 (Figs. 1, 2 and 3) when actuated presses against the pusher plate 85 and is supported in a bearing in a web or bracket 60. A buffer spring 89 always tends to hold this sliding spindle in its withdrawn position. A lever 90 (Figs. 2 and 4) fulcrumed upon a suitable support 91 is arranged at one end to bear against the end of this longitudinally sliding spindle 88 and moves the same while the other end of said lever 90 carries an anti-friction roller 92 which is actuated by a face cam 93 fixed upon the end of the cam shaft 37. This cam 93 is shaped as illustrated in Figs. 1 and 2. This leading end of its raised portion is formed with a small additional projection 94 which serves through intermediate mechanism to push the bobbin well home into the bobbin case and then releases the pressure while however, retaining the hook 87 in position to guide the cotton under the tension piece as hereinafter described.

A sliding locking device consisting of sliding bar 95 (Figs. 1 and 4) having a projecting lug 96 is arranged to engage with one of three notches 97 (see Figs. 1 and 5) in a wheel or stop disk 98 fixed upon the sleeve 76 of the bobbin conveyer 77. A small spiral spring 99 is arranged to normally hold the locking device 95 in engagement with said stop disk 98 and a conveniently arranged projecting handle 100 is provided to enable this locking device to be released by hand when desired but it is normally unlocked by a cam 101 upon the cam shaft 37. This spring locking device retains the bobbin conveyer 77 in a certain position between each operation. A spring 102 (Fig. 4) is screwed to the bracket 60 and a pin 103 projecting from said spring through a hole in the bracket presses upon the stop disk 98 in order to act as a brake upon the conveyer as it revolves.

A comparatively large toothed wheel 104 is mounted upon the winder shaft 105 so that it can gear with one of the pinions 82 as hereinafter described.

Two sprocket wheels 106 and 107, one fixed upon the winder shaft 105 and the other upon a tubular bearing in the same manner as the sprocket wheel 54 are connected by a chain 108 in order that motion may be communicated from the main shaft 1 to the winder shaft 105.

The sprocket wheel 107 is fitted with a disappearing clutch pin 109 which is adapted to engage with holes in or pins upon a clutch 110 keyed upon the main shaft. A fork 112 is mounted upon a horizontal slidable rod 113 and is normally held in its rearward position by a buffer spring 114 so that said fork normally holds the clutch 110 out of gear with the sprocket wheel 107. The said rod 113 carries a small anti-friction roller 115 which bears against an inclined surface 116 on one of the sliding plates 7. A pivoted trip lever 117 one end of which 118 is hooked shaped is arranged to engage with a projecting pin 119 fixed to the rod 113. The forward end of this trip lever 117 is adapted to be depressed by the cotton as it is wound upon the metallic or other bobbin 15 the parts being so arranged that when said bobbin is filled the end of the trip lever 117 will be depressed against the pressure of a spring 120 sufficiently to raise its hook shaped end 118 out of engagement with the pin 119 so that the buffer spring 114 may draw the clutch 110 out of engagement with the sprocket wheel 107.

The tension device of the bobbin case is of the construction usual in rotary shuttle sewing machines of the class to which my invention is especially applicable. The means employed for passing the thread from the wound bobbin after it has been inserted in the bobbin case comprise a small hook shaped arm 121 (see Figs. 1 and 16) which is carried by a partially rotatable and longitudinally sliding spindle 122. This spindle is fitted inside a sleeve or casing 123 mounted or cast upon the underside of the bedplate. It has a spiral spring 124 wound round it and secured to a collar 125 (Fig. 16) fixed upon said spindle 122 at one end of said spring and fixed to the cap of the casing 123 at the other end. Said spring 124 is arranged so that it always tends to force said spindle forward towards the front of the machine and it is also wound up so that it always tends to turn the hook shaped arm 121 up into a horizontal position against the underside of the bedplate. This hooked shaped arm 121 is, however, normally held in a depending or vertical position by means of a face cam 126 upon the cam shaft 37 bearing against an anti-friction roller upon a lever 127 carried by a suitable bracket 128 and fitted at its upper end with another anti-friction roller 129 arranged to bear against a pin or horn 130 projecting from the spindle 122 as illustrated in Fig. 20. A spiral spring 131 is connected with this lever 127 and tends to draw it out of engagement with the pin or horn 130 so as to release the spindle 122 and thereby allow the spiral spring 124 to turn the hook shaped arm 121 into its horizontal position.

A T-piece 132 pivoted upon the spindle of the anti-friction roller 129 (Figs. 20 and 21) is arranged to engage under a fixed stationary curved guide 133 and also under the pin or horn 130 in order to act in conjunction with the spring 124 in turning the hook shaped arm from its vertical or depending position into its horizontal position.

The spindle 122 is withdrawn or moved longitudinally by means of a bell-crank lever 134 pivoted upon the underside of the bedplate of the machine and acted upon by a face cam 136.

A pair of grippers or tweezers 137 (see Figs. 14 and 15) are used to hold the cotton as hereafter described. One arm of said grippers is mounted in a bearing 138 so that it is free to slide longitudinally but cannot rotate. One end of a lever 139 fulcrumed about its center is connected with this arm while the other end of said lever is operated on by a grooved cam 140 upon the cam shaft 37 said cam being shaped as shown in Fig. 2 so that at a certain point in the revolution of the cam shaft it will move said grippers or tweezers 137 bodily forward into the position indicated by dotted lines in Fig. 14. A longitudinally sliding draw rod or spindle 141 is fitted with a roller and a pin which are arranged to engage with the other arm of the pair of grippers or tweezers 137, its other end is fitted with an anti-friction roller 142 which is adapted to be engaged by a hook shaped cam 143 also mounted upon the cam shaft and constructed as illustrated in Fig. 2. This arrangement serves to open the grippers or tweezers 137 at a certain point in the revolution of the cam shaft, that is just prior to the cam 140 coming into operation to move said grippers forward.

Around the spindle 141 is a small spiral spring 144 which always tends to close the grippers.

Upon the end of one of the jaws of the grippers 137 is a small projection 145 which fits into a recess in the opposite jaw and insures the cotton being withdrawn by said grippers.

A pair of scissors 146 are arranged above the grippers. One arm or handle of these scissors is rigidly fixed to a suitable support in such a way that they can readily be removed if desired in order to sharpen them. Their other arm is connected to a longitudinally sliding rod 147 by a pin 148 which is screwed into said arm and engages with a slot in the end of said rod. A spiral spring 152 is fitted upon the rod 147 whose tendency is to keep the scissors open. The end of this rod 147 bears against a cam 149 upon the cam shaft, said cam being shaped as illustrated in Fig. 2 so that it closes the scissors at a certain point in the operation, that is after the tweezers have gripped the cotton and the threading of the bobbin case has been effected.

An inclined guide 150 is carried by a suitable support such for instance as the bracket for supporting the grippers and scissors, said inclined guide is so arranged as to bear against the empty bobbin 15 as it is carried past by the bobbin conveyer 77 so as to force said empty bobbin firmly on to its split spring gripping spindle 81, said inclined guide being formed with a groove 151 to enable said spindle to pass.

Instead of using the hollow main shaft as a central pusher spindle 2 as above described two or more similar spindles might be used as illustrated in Fig. 13, said spindles being arranged to work in grooves or guides cut for the purpose in the sides of the main shaft and being connected at their outer end by a sleeve 5 as shown.

In place of the grippers 137 it may be preferable to employ three arms 153 (Fig. 22) one fixed to each pushing off plate 86. These arms are curved in order to clear the hook shaped arm 121 and have a small spring 154 at their outer ends in order to grip the cotton when it is pulled down between said arm and spring by the movement of the hook shaped arm 121. The forward movement of the pusher plate 86 and arm causes the arm to engage with the cotton and push it into position to enable the threading to be accomplished and between the blades of the scissors so that it will be severed when the scissors are closed after the threading of the under tension has been completed.

With a sewing machine fitted with my invention the operator is enabled to insert a full freshly wound bobbin into the bobbin case practically without loss of time, the sound of the machine notifying when the bobbin case requires replenishing. The operator then stops the machine with the take up and needle in their raised positions. The sliding plate 7 is then drawn forward by the operator by means of the handle 31 until the spring locking pin or bolt 34 engages with its recess 35 and locks said plate 7 in its forward position. The effect of moving this plate forward is to cause the inclined surfaces 6 6 to move the sleeve 5 and therefore the pusher shaft 2 to the left, that is towards the shuttle end of the machine. The end of this pusher shaft bears against the boss 13 upon the washer 8 and forces the empty bobbin out of the bobbin case on to its split spring gripping spindle 81 which is kept in position ready to receive it by the stop disk 98 and lock 96.

In addition to pushing out the empty bobbin the movement of the sliding plate 7 causes the inclined surfaces 40 40 to force the clutch 48 out of engagement with the clutch 49 through the instrumentality of the shaft 46. This movement brings the clutch 48 into engagement with the disappearing clutch pin 53 on the sprocket wheel 54 thus throwing the main shaft 1 into gear with the cam shaft 37 and disconnecting the shuttle half of the main shaft from the rear half. The inclined surface 116 of the sliding plates 7 will, on the plates being drawn forward as above described, also draw the fork 112 to the left and put the clutch 110 into gear with the disappearing clutch pin 109 upon the sprocket wheel 107. The operator now commences to work the machine in the ordinary manner. The rear portion of the main shaft 1 revolves at the same time rotating both the cam and winder shafts. The cam 69 forces up the lever 66 against the pressure of the spring 68 until the outer end of this lever 66 engages behind the clutch 48 thereby holding said clutch in gear with the sprocket wheel 54, and the cam 101 engages with the rod 95 and pushes back the locking device 96 until it disengages with the stop disk 98. As the revolution continues the hooked shaped cam 143 engages with the projecting roller 142 on the end of the sliding rod 141 and commences to open the grippers or tweezers 137. The teeth 74 on the segmentally toothed wheel 73 now engage with the teeth of the wheel 75 and commences to turn the bobbin conveyer 77 round. The effect of this movement of the bobbin conveyer 77 is to carry the empty bobbin, which has just been discharged from the bobbin case, up past the inclined guide 150 whereby it will be pushed firmly on to its split spring gripping spindle 81 and also to carry a full bobbin from the position adjacent to the winder shaft 105 up into position opposite the bobbin case and the spare bobbin upon the downwardly projecting arm of the bobbin conveyer into position for being rewound. A length of cotton is by this movement led from the full bobbin past and into the empty bobbin (which has been brought to the position for being rewound) and thence through guides to the supply reel. The curved hook 87 belonging to the full bobbin guides the cotton between the flanges of the empty bobbin as the latter comes forward. As the full bobbin is brought into position in front of the bobbin case the cam 36 draws back the spring locking pin or bolt 34 so that the spring 33 may return the sliding plates 7 to their normal position and the springs 21 and 45 may return the pusher shafts 2 and 46 to their normal positions. At the same time the cam 140 operates upon the lever 139 so as to move the grippers or tweezers 137 bodily forward into the position shown by dotted lines in Fig. 14 when their gripping jaws will be one on each side of the cotton. The cam 93 now commences to operate upon the lever 90, and thereby forces the sliding spindle 88 against the rear pusher plate 85 of the pusher spindles 83 causing the forward pushing off plate 86 to force the full metallic or other bobbin forward into the bobbin case 9, and at the same time forcing the hook 87 to guide the cotton into the tension slot and hold it ready to be drawn up under the tension as hereafter described.

As the cam shaft 37 continues to rotate the hooked shaped cam 143 will release the grippers 137 and allow the spring 144 to close them so that their jaws will grip the cotton firmly. The cam 140 then commences to draw the grippers or tweezers rearwardly carrying with them the cotton gripped by them. The cam 126 releases the hook shaped arm 121 and allows the spring 124 to turn said hook shaped arm up into its horizontal position beneath the bedplate. The movement of this arm 121 causes it to engage the cotton. The cam 136 now acts upon the bell-crank lever 134 and draws back the sliding spindle 122 carrying the hook shaped arm 121 and with it the cotton until this latter is carried to the proper position for engagement with the ordinary tension piece of the bobbin case. When this cotton has been threaded under the tension piece the cam 136 releases the bell crank lever 134 and allows the spring 124 to return the spindle 122 and hook shaped arm 121 to their forward positions. The cam 149 now commences to close the scissors so that they sever the cotton. At the same time the cam 126 commences to move the hook shaped arm 121 by causing the lever 127 to contact against the projecting pin or horn 130 and turns the said hook shaped arm 121 from the position shown in dotted lines in Fig. 16 into its vertical depending position as shown in full lines in said figure. This action is illustrated in Figs. 20 and 21. It will of course be understood that all these movements take place during a single revolution of the cam shaft. At the completion of this revolution the cam 69 will release the clutch locking lever 66 and so allow the clutch 48 to be disengaged from the sprocket wheel 54 by the spring 52 and to engage with the clutch 49 so that the shuttle will be revolved and the cam shaft will remain stationary while a fresh bobbin is again rewound. The winder shaft 105 will continue to revolve until a sufficient quantity of cotton has been wound to depress the trip lever 117 and thereby raise its hook shaped end 118 out of engagement with the pin 119 and rod 113 which is then free to be moved back by its operating buffer spring 114 and thereby disconnect the clutch 110 and stopping the winding mechanism. Ordinarily this takes place after about eight inches of sewing has been done by the machine depending of course on the coarseness of the cotton, the length of stitch, etc. This completes the operation and the entire mechanism is out of gear and is not again utilized until the bobbin case again requires replenishing with a full bobbin.

Having now particularly described and ascertained the nature of my said invention and in what manner the same is to be used I declare that what I claim is:—

1. In mechanism of the class described, a main shaft, a cam shaft and a winder shaft, a bobbin pushing off shaft coöperative with the main shaft, a bobbin case carried by the main shaft, a bobbin conveyer for supporting a plurality of bobbins, means for actuating the bobbin conveyer to bring the bobbins supported thereby in position to be received by the bobbin case on the main shaft, means for transferring the bobbins from the conveyer to the bobbin case, and means for actuating the pushing off shaft to release a bobbin from the bobbin case.

2. In a mechanism of the class described, a main hollow shaft, a winding shaft, a bobbin case carried by the main shaft, a bobbin conveyer having a plurality of bobbins, means for transferring each of the bobbins from the conveyer to the bobbin case, the winding shaft being operative by the main shaft, and means extending through said main shaft for releasing the bobbin from the case carried by the same.

3. In a mechanism of the class described, a main shaft carrying a bobbin case, a winding shaft operative by the main shaft, a bobbin conveyer having a plurality of bobbins, means for transferring each of the bobbins from the conveyer to the bobbin case, and means associated with the main shaft for releasing each bobbin from the case.

In witness whereof I have signed my name to this specification in the presence of two subscribing witnesses.

EDMUND ALBERT ANGUS.

Witnesses:
PERCY HEDGES,
SIDNEY HENDLEY.